US012509642B2

(12) United States Patent
Cooney, Jr. et al.

(10) Patent No.: US 12,509,642 B2
(45) Date of Patent: Dec. 30, 2025

(54) OVEN CLEANING COMPOSITIONS AND METHODS OF MAKING AND USING SAME

(71) Applicant: Reckitt & Colman (Overseas) Hygiene Home Limited, Slough (GB)

(72) Inventors: Edward Matthew Cooney, Jr., Montvale, NJ (US); Heidi Fuentes, Montvale, NJ (US); Kyle Robbins, Montvale, NJ (US); Jakub Trawinski, Montvale, NJ (US); Lisa Young, Montvale, NJ (US)

(73) Assignee: Reckitt & Colman (Overseas) Hygiene Home Limited, Slough (GB)

( * ) Notice: Subject to any disclaimer, the term of this patent is extended or adjusted under 35 U.S.C. 154(b) by 474 days.

(21) Appl. No.: 17/794,175

(22) PCT Filed: Jan. 22, 2021

(86) PCT No.: PCT/GB2021/050150

§ 371 (c)(1),
(2) Date: Jul. 20, 2022

(87) PCT Pub. No.: WO2021/148806

PCT Pub. Date: Jul. 29, 2021

(65) Prior Publication Data

US 2023/0058960 A1 Feb. 23, 2023

Related U.S. Application Data

(60) Provisional application No. 62/964,803, filed on Jan. 23, 2020.

(51) Int. Cl.

| | |
|---|---|
| ***C11D 3/00*** | (2006.01) |
| ***C11D 1/10*** | (2006.01) |
| ***C11D 3/04*** | (2006.01) |
| ***C11D 3/20*** | (2006.01) |
| ***C11D 3/43*** | (2006.01) |

(52) U.S. Cl.

CPC .............. *C11D 3/0057* (2013.01); *C11D 1/10* (2013.01); *C11D 3/044* (2013.01); *C11D 3/2034* (2013.01); *C11D 3/2068* (2013.01); *C11D 3/43* (2013.01)

(58) Field of Classification Search

None

See application file for complete search history.

(56) References Cited

U.S. PATENT DOCUMENTS

| | | | | |
|---|---|---|---|---|
| 5,380,454 | A | 1/1995 | Griepenburg et al. | |
| 5,977,042 | A | 11/1999 | Hernandez et al. | |
| 6,528,478 | B2 | 3/2003 | Totoki | |
| 6,683,036 | B2 | 1/2004 | Foley et al. | |
| 6,740,628 | B2 | 5/2004 | Bennie et al. | |
| 6,750,187 | B2 | 6/2004 | Alam et al. | |
| 2002/0037822 | A1 | 3/2002 | Foley et al. | |
| 2002/0169090 | A1 | 11/2002 | Foley et al. | |
| 2003/0109411 | A1* | 6/2003 | Kilkenny ............. | C11D 3/3746 510/438 |
| 2003/0119689 | A1* | 6/2003 | Hutton ..................... | C11D 3/43 510/475 |
| 2004/0149311 | A1* | 8/2004 | Foley ....................... | C11D 3/37 134/4 |
| 2004/0157763 | A1 | 8/2004 | Foley et al. | |
| 2005/0003990 | A1 | 1/2005 | Smith et al. | |
| 2005/0233925 | A1 | 10/2005 | Foley et al. | |
| 2007/0093404 | A1 | 4/2007 | Gross et al. | |
| 2011/0190187 | A1 | 8/2011 | Hawes et al. | |

FOREIGN PATENT DOCUMENTS

| | | | |
|---|---|---|---|
| WO | 2000020518 | A1 | 4/2000 |
| WO | 2001010961 | A1 | 2/2001 |
| WO | 2001061099 | A1 | 8/2001 |
| WO | 2002006436 | A1 | 1/2002 |
| WO | 2002006437 | A1 | 1/2002 |
| WO | 2002006438 | A1 | 1/2002 |
| WO | 2003027218 | A1 | 4/2003 |
| WO | 2006071194 | A1 | 7/2006 |
| WO | 2008003161 | A1 | 1/2008 |
| WO | 2009100227 | A1 | 8/2009 |
| WO | 2011027673 | A1 | 3/2011 |
| WO | 2011090824 | A2 | 7/2011 |
| WO | 2012160462 | A2 | 11/2012 |
| WO | 2017011216 | A1 | 1/2017 |
| WO | 2017011217 | A1 | 1/2017 |
| WO | 2017205334 | A1 | 11/2017 |

OTHER PUBLICATIONS

International Search Report and Written Opinion of the International Searching Authority for corresponding application PCT/GB2021/050150 dated Apr. 30, 2021.

* cited by examiner

*Primary Examiner* — Necholus Ogden, Jr.

(74) *Attorney, Agent, or Firm* — Norris McLaughlin, PA

(57) ABSTRACT

Cleaning composition for hard surfaces are disclosed, particularly for cleaning hard surfaces stained with greasy burnt-on deposits such as frequently occur on stovetop and oven surfaces. Processes to manufacture the cleaning composition, as well as methods for their use are also disclosed.

16 Claims, No Drawings

OVEN CLEANING COMPOSITIONS AND METHODS OF MAKING AND USING SAME

CROSS REFERENCE TO RELATED APPLICATIONS

This is an application filed under 35 USC 371 based on PCT/GB2021/050150, filed 22 Jan. 2021, which claimed priority to U.S. 62/964,803, filed 23 Jan. 2020. The present application claims the full priority benefit of all prior applications and incorporates by reference their full disclosures as if set forth herein.

TECHNICAL FIELD

Cleaning composition for hard surfaces are disclosed, particularly for cleaning hard surfaces stained with greasy burnt-on deposits such as frequently occur on stovetop and oven surfaces. Processes to manufacture the cleaning composition, as well as methods for their use are also disclosed.

BACKGROUND ART

The prior art has proposed compositions which appear to find use in the removal of burnt-on deposits upon hard surfaces as are typically encountered on stovetops and oven surfaces.

U.S. Pat. No. 5,380,454 to Griepenberg discusses a non-caustic oven cleaner composition which comprises 1%-12% of monoethanolamine, 2-20% diethylene glycol mono butyl ether, and 1-10% of sodium carbonate or potassium carbonate. Optionally, up to 60% of the monoethanolamine may be substituted by diethanolamine. The composition may be used in an unpressurized liquid form. The composition may be aerosolized by adding thereto about 2-10% of a propellant in providing the same in a pressurized container having an aerosol valve. The composition is lauded to be effective at room temperature (approx. 68° F., 20° C.).

U.S. Pat. No. 6,683,036 to Procter & Gamble discloses a hard surface cleaning composition for removing cooked-, baked-, or burnt-on soils from cookware and tableware. The composition comprises an organoamine solvent. The composition has a liquid surface tension of less than about 24.5 mN/m and a pH, as measured in a 10% solution in distilled water, of less than 10.5.

U.S. Pat. No. 7,902,136 to Envirochem discloses an agent to remove paint, lacquer, rubber, glue, plastic or similar objects.

U.S. Pat. No. 8,394,751 to W M Barr discloses an organic residue remover composition useful to remove from very oily type soils to very watery contaminants from various surfaces.

U.S. Pat. No. 9,023,782 to Ecolab discloses a non-corrosive degreasing concentrate and ready to use formulation.

PCT Publication WO 2003/027218 to Procter & Gamble discloses a hard-surface cleaning, optionally silicate-containing composition for removing cooked-, baked-, or burnt-on food soil from cookware and tableware. The composition comprises a smectite-type clay thickening agent and a hydrophobically modified polyacrylate polymer.

PCT Publication WO 2017/011216 to Procter & Gamble discloses that glycol ether solvents may be used in liquid cleaning compositions to improve the removal of hydrophobic stains from hard surfaces, and also improve the sudsing profile of the composition.

PCT Publication WO 2017/011217 to Procter & Gamble discloses a cleaning product comprising a spray dispenser and a cleaning composition suitable for spraying and foaming. The composition is housed in a spray dispenser. The composition comprises i) from about 5 to about 15% by weight of the composition of a surfactant system; and ii) a glycol ether solvent, wherein the surfactant system and the glycol ether solvent are in a weight ratio of from about 5:1 to about 1:1.

PCT Publication WO 2017/205334 to Ecolab discloses alkaline sprayable aqueous compositions for cleaning, sanitizing, and disinfecting.

Notwithstanding the existence of the foregoing compositions, each of which provides some degree of benefit, there remains a real and pressing need for improvements in hard surface cleaning compositions effective in the removal of burnt-on deposits which adhere to their surfaces. Particularly a need remains for hard surface cleaning compositions which are effective in the removal of burnt-on deposits from stovetop and oven surfaces, and especially where said compositions are effective at room temperature (approx. 20° C.-22° C., approx. 68° F.-72° F.).

It is to these and other objects that the present invention is directed.

SUMMARY OF INVENTION

Caustic hard surface cleaning compositions are disclosed which are effective in the removal of burnt-on deposits from stovetop and oven surfaces. Said compositions are effective at room temperature (approx. 20° C.-22° C., approx. 68° F.-72° F.). In particular such surfaces include those commonly encountered in cooking appliances, such as a glass, metal, and/or enameled metal surfaces.

In a further aspect, there is provided a method of forming these said hard surface cleaning compositions. The method includes: combining measured amounts of the constituents and mixing the same in order to form a homogenous mixture therefrom.

In a yet further aspect there is provided a method for the removal of burnt-on deposits from stovetop and oven surfaces, at or at about room temperature (approx. 20° C.-22° C., approx. 68° F.-72° F.), and/or at higher temperatures. The method includes applying a cleaning effective amount of the composition of claim 1 onto a greasy baked deposit on a surface and allowing the composition to remain in contact with the greasy baked deposit for sufficient time whereby at least a part of the greasy baked deposit is released from the surface on which it is present.

These and further aspects of the invention are disclosed in the following.

DESCRIPTION OF EMBODIMENTS

A liquid, flowable hard surface cleaning composition effective in the removal of burnt-on deposits from stovetop and oven surfaces is disclosed. Said compositions are effective at room temperature.

A first essential constituent of the inventive compositions are organic solvents which comprise a binary system of organic solvents, including both benzyl alcohol and dipropylene glycol n-propyl ether. The inventors have surprisingly found that this specific binary system of organic solvents unexpectedly provided an unforeseen improvement in the removal of burnt-on deposits from stovetop and oven surfaces, even at room temperature, as compared to other organic solvents, or binary or ternary systems of organic solvents which failed to include both benzyl alcohol and dipropylene glycol n-propyl ether. The binary system necessarily includes both benzyl alcohol and dipropylene glycol n-propyl ether optionally with one or more further and different organic solvents. The total amount of both benzyl alcohol and dipropylene glycol n-propyl ether provide at least 75% wt., more preferably at least 90% wt. of the total amount of organic solvents present in the inventive compositions. Alternatively, the binary system may exclude further organic solvents based on $C_1$-$C_{12}$ mono- or poly-hydric alcohols and/or $C_1$-$C_{12}$ mono- or poly-hydric ethers. In one alternative, the binary system of organic solvents, including both benzyl alcohol and dipropylene glycol n-propyl ether, are present and used to the exclusion of other glycol and/or glycol ether solvents, including those identified as being within the DOWANOL series of organic solvents, and/or the CARBITOL series of organic solvents. However, in certain embodiments, such further organic solvents may be present in addition to the essential benzyl alcohol and dipropylene glycol n-propyl ether solvents. The total amount of organic solvents in the compositions may be as little as about 4.5% wt. to about 25% wt., based on the total weight of the composition. Advantageously the organic solvents present comprise not more than, in order of increasing preference: 20% wt., 19% wt., 18% wt., 17% wt., 16% wt., 15% wt., 14% wt., 13% wt., 12% wt., 11% wt., 10% wt., and 9% wt. based on the total weight of the composition of which it forms a part. Thus the total amount of organic solvents present does not exceed 25% wt. based on the total weight of the composition of which it forms a part.

The essential binary system of organic solvents is present in an amount of at least about 4% wt., and in order of increasing preference is present in an amount of 4.5%, 4.75%, 5%, 5.25%, 5.5%, 5.75%, 6%, 6.25%, 6.5%, 6.75%, 7%, 7.25%, 7.75%, 8%, 8.25%, 8.5%, 8.75% and 9% by weight, based on the total weight of the composition of which it forms a part. Conversely, the essential binary system of organic solvents is present in an amount of less than about 9% wt., and in order of increasing preference is present in an amount of not more than 8.75%, 8.5%, 8.25%, 8%, 7.75%, 7.5%, 7.25%, 7%, 6.75%, 6.5%, 6.25%, 6%, 5.75%, 5.5%, 5.25%, 5%, 4.75%, and 4.5% by weight, based on the total weight of the composition of which it forms a part. Preferred ranges include between about 4.5% wt. to about 8% wt., and especially preferred are the weight percentages and the ranges between any two of the weight percentages of example compositions reported on Table 2.

Within the essential binary system of organic solvents, it is also preferred that the benzyl alcohol and dipropylene glycol n-propyl ether be present in specific relative weight ratios of benzyl alcohol:dipropylene glycol n-propyl ether, preferably about 0.05-0.75:1, still more preferably 0.15-0.5:1, yet more preferably 0.15-0.4:1, still more preferably 0.15-0.35:1, and with especially preferred ratios being exemplified by one or more of the example compositions.

In certain preferred embodiments, benzyl alcohol and dipropylene glycol n-propyl ether are the sole organic solvents present in the compositions of the invention.

Particularly preferred total amounts of the binary system of organic solvents present in the compositions of the invention, as well as relative amounts of the benzyl alcohol and dipropylene glycol n-propyl ether with respect to the binary system of organic solvents present, are indicated amongst the example compositions disclosed hereinafter.

The compositions of the invention are necessarily caustic and have a pH of at least about 10, and in order of preference, have a pH of at least 10.5, 11, 11.25, 11.5, 11.75, 12, 12.25, 12.5, 12.75, 13, 13.25, 13.5, 13.75 and 14. Compositions having a pH of at least about 12.5, and preferably at least about 13 are preferred.

To establish the required caustic character of the compositions, a pH adjusting constituent may be used to establish and/or maintain, viz., buffer, a composition at a desired pH or within a bounded pH range. Essentially any material which may increase the pH is suitable as a pH adjusting constituent. Suitable pH adjusting constituents are one or more bases, whether such be based on organic and/or inorganic compounds or materials. By way of non-limiting example, pH adjusting agents include phosphorus containing compounds, monovalent and polyvalent salts such as of silicates, carbonates, and borates, and basic compositions, which are typically required in only minor amounts. By way of further non-limiting example, pH buffering compositions include the alkali metal phosphates, polyphosphates, pyrophosphates, triphosphates, tetraphosphates, silicates, metasilicates, polysilicates, carbonates, hydroxides, and mixtures of the same. Certain salts, such as the alkaline earth phosphates, carbonates, and hydroxides, may also function as buffers. It may also be suitable to use as buffers such materials as aluminosilicates (zeolites), borates, and aluminates. Preferred and exemplary and useful pH adjusting constituents include alkali metal carbonates, especially alkali metal carbonate, alkali metal hydroxides, especially sodium hydroxide, and organic amines such as monoalkanolamines, dialkanolamines, trialkanolamines, and alkylalkanolamines including alkyl-dialkanolamines, and dialkyl-monoalkanolamines. Such amines may also function as detersive surfactants, and, when present may improve the cleaning properties of the compositions of which they form a part. The alkanol and alkyl groups are generally short to medium chain length, that is, from 1 to 7 carbons in length. For di- and trialkanolamines and dialkyl-monoalkanolamines, these groups can be combined on the same amine to produce for example, methylethylhydroxypropylhydroxylamine. One of ordinary skill in the art may readily ascertain other members of this group. Preferred pH adjusting constituents include one or more of, and in certain instances two or more of: alkanolamines, alkali metal carbonates and alkali metal hydroxides, especially preferably monoethanolamine, and/or sodium hydroxide and/or potassium carbonate, which are also demonstrated in one or more of the example compositions of Table 2. Preferred amounts and preferred relative ratios of two or more individual pH adjusting constituents are also illustrated on Table 2.

The amount of the pH adjusting constituent used in the inventive compositions may be any amount in order to establish a desired pH ranging from approximately 10 to approximately 14, preferably of at least about 12, and more preferably at least about 12.8. As used herein, the terms "about" or "approximately" mean within 10% of the cited values. As used herein, any and all ranges are inclusive of their endpoints. For example, a pH ranging from 10 to 14 would include formulations having a pH of 10, formulations having a pH of 14, and formulations having any pH between 10 and 14. As used herein, normal temperature and pressure means the NIST normal temperature and pressure of 20° C. and 1 atm (101.325 kPa).

Advantageously the pH adjusting constituent is present in an amount of about 0.5-10% wt, more preferably in an amount of about 2-9% wt., and still more preferably is present in an amount of about 5-8% wt., based on the total weight of the composition of which the pH adjusting constituent forms a part.

One of ordinary skill in the art will recognize that sodium hydroxide is a highly caustic base. As a result, shorter contact times may be used with formulations including sodium hydroxide. As shown in the examples that follow, oven cleaning times are improved when the same quantity of sodium hydroxide is combined with the claimed binary system of organic solvents as compared to prior art solvent systems. The examples further demonstrate that the disclosed binary system of organic solvents also decrease the contact time for formulations that do not contain the sodium hydroxide base. This ability to reduce the required contact time is beneficial as it results in quicker cleaning.

In certain further preferred embodiments, the pH adjusting constituent comprises at least two materials. In one such preferred embodiment, a binary pair of pH adjusting constituents is used. The binary pair is an alkanolamine, preferably monoethanolamine, with an alkali metal hydroxide, especially sodium hydroxide. The sodium hydroxide is present in an excess of the monoethanolamine. Preferably the amount of the alkali metal hydroxide is at least 1.5 times, or more, of the amount of the alkanolamine, when measured in a relative % wt. basis of these two components of the binary pair. As discussed above, the sodium hydroxide component helps to shorten the contact time.

In a further such preferred embodiment, a binary pair of pH adjusting constituents is used. The binary pair is an alkanolamine, preferably monoethanolamine, with an alkali metal carbonate, especially potassium carbonate. The potassium carbonate is present in an excess of the alkanolamine. Preferably the amount of the alkali metal carbonate is at least 1.5 times, or more, of the amount of the alkanolamine, when measured in a relative % wt. basis of these two components of the binary pair. Certain particularly preferred binary pairs of pH adjusting constituents, and their respective weight percentages within compositions according to the invention are disclosed hereinafter.

In order to increase the viscosity of the compositions, a further essential constituent of the invention is a water soluble or water dispersible thickener constituent. Increased viscosity aids in the retention of the composition upon vertical or inclined surfaces, such as oven surfaces that include substantially vertical sidewalls and the upper surfaces. The thickener constituent must be generally compatible with the other ingredients of the composition and should not adversely affect them or itself be adversely affected by the other ingredients. Suitable thickening constituents include colloidal magnesium aluminum silicate, hydroxyethyl cellulose, sodium carboxymethyl cellulose, sodium carboxyethyl cellulose; bentonite; alginate, amylopectin starch, carboxyl vinyl polymers, xanthan gums, fumed amorphous silica, and the like. The type and amount of thickening constituent can be selected to provide a pseudoplastic composition or a thixotropic composition. Preferably the viscosity of the compositions is at least 40 cPs, more preferably is between about 200 and 500 cPs when measured using conventional quantitative methods, e.g., as measured at 20° C. or 25° C. by Brookfield LVT #3 at 30 RPM for 60 seconds.

A preferred class of thickener constituents are based on inorganic materials including clays. Clay thickeners comprise, for example, colloid-forming clays, for example, such as smectite and/or attapulgite types. The clay materials can be described as expandable layered clays, i.e., aluminosilicates and magnesium silicates. The term "expandable" as used to describe the instant clays relates to the ability of the layered clay structure to be swollen, or expanded, on contact with water. The expandable clays used herein are those materials classified geologically as smectites (or montmorillonite or bentonite or hectorite) and attapulgites (or polygorskites). Commercially available clays include, for example, montmorillonite, bentonite, hectorites, volchonskoite, nontronite, beidellite, saponite, sauconite and vermiculite. The clays herein are available under various trade names such as POLARGEL™ HV from American Colloid Company; LAPONITE™ from BYK Additives Ltd. Corp.; and VEEGUM™ from R. T. Vanderbilt Co. When present, such clays are present in an amount of up to about 5% wt. based on the total weight of the compositions. The clays preferably comprise between 0% wt.-4.5% wt, more preferably between 0.5-4% wt., still more preferably between 0.75% wt.-2% wt. of the composition. Especially preferred amounts of the clay thickener which are advantageously included are disclosed in or more of the example compositions disclosed below.

Optionally but in certain cases, wax based thickeners are desirably or even necessary added to the compositions. Such wax based thickeners, when present, advantageously improve the adherence of the composition to the burnt-on residue to be removed. Non-limiting, albeit preferred wax based thickeners include beeswax, microcrystalline wax, or paraffin wax. The wax-based thickener may be provided in the form of emulsions or in a solid, preferably a comminuted solid form such as particulates or powders. When present, such wax based thickeners are present in amounts of up to about 5% wt. The wax based thickeners preferably comprise between 0% wt.-4.5% wt, more preferably between 0.1-3% wt., still more preferably between 0.5-2% wt. and particularly preferably between 0.75-1.5% wt. based on the total weight of the treatment composition of which it forms a part. Especially preferred amounts of the wax based thickener which are advantageously included are disclosed in or more of the example compositions disclosed below.

The compositions of the invention may optionally, but in some instances preferably or necessarily, include a surfactant. The surfactant may be essentially any one or more surfactants which aid in the removal of greasy baked deposits. Suitable surfactants include one or more nonionic or anionic surfactants. The inclusion of a surfactant facilitates the wetting of surfaces and aids in the distribution of the composition onto the soiled surface. While not wishing to be held to this theory it is believed by the inventors that the binary system of organic solvents, including both benzyl alcohol and dipropylene glycol n-propyl ether, aids in the dissolution of or the solvation of the carpace of the burnt-on deposits on the surfaces to be treated. The surfactant may further aid in the solvation of the greasy burnt-on deposits, facilitating in their removal from the surface begin treated. Addition of a surfactant may be desired when the pH adjusting constituent does not include sodium hydroxide. Additionally, certain surfactants, such as certain anionic surfactants may also provide a foaming benefit which is frequently desirable from the perception of consumers.

Non-limiting examples of nonionic surfactants include the polyoxyethylene ethers of alkyl aromatic hydroxy compounds, e.g., alkylated polyoxyethylene phenols, polyoxyethylene ethers of long chain aliphatic alcohols, the polyoxyethylene ethers of hydrophobic propylene oxide polymers, and the higher alkyl amine oxides.

Non-limiting examples of anionic surfactants include alcohol sulfates and sulfonates, alcohol phosphates and phosphonates, alkyl ester sulfates, alkyl diphenyl ether sulfonates, alkyl sulfates, alkyl ether sulfates, sulfate esters of an alkylphenoxy polyoxyethylene ethanol, alkyl monoglyceride sulfates, alkyl sulfonates, alkyl ether sulfates, alpha-olefin sulfonates, beta-alkoxy alkane sulfonates, alkyl ether sulfonates, ethoxylated alkyl sulfonates, alkylaryl sulfonates, alkylaryl sulfates, alkyl monoglyceride sulfonates, alkyl carboxylates, alkyl ether carboxylates, alkyl alkoxy carboxylates having 1 to 5 moles of ethylene oxide, alkylpolyglycolethersulfates (containing up to 10 moles of ethylene oxide), sulfosuccinates, octoxynol or nonoxynol phosphates, taurates, fatty taurides, fatty acid amide polyoxyethylene sulfates, acyl glycerol sulfonates, fatty oleyl glycerol sulfates, alkyl phenol ethylene oxide ether sulfates, paraffin sulfonates, alkyl phosphates, isethionates, N-acyl taurates, alkyl succinamates and sulfosuccinates, alkylpolysaccharide sulfates, alkylpolyglucoside sulfates, alkyl polyethoxy carboxylates, and sarcosinates or mixtures thereof.

Of course the selection of surfactants should be made as to not deleteriously affect the overall performance of the compositions and its ability to remove undesired dried and/or burnt-on soil deposits from hard surfaces. When present one or more surfactants are present in amounts of up to about 5% wt. When present, the surfactant compounds comprise between 0% wt.-4% wt, more preferably between 0.1-2.5% wt., still more preferably between 0.1-1% wt. and particularly preferably between 0.1-0.5% wt. based on the total weight of the treatment composition of which it forms a part. Especially preferred amounts of surfactants which are advantageously included are disclosed in or more of the example compositions disclosed below.

In certain preferred embodiments, a sarcosinate surfactant is necessarily present in the compositions. Exemplary sarcosinate surfactants are alkali metal salts of N-alkyl-N-acyl amino acids. These salts are derived from the reaction of (1) N-alkyl substituted amino acids of the formula:

$$R_1—NH—CH_2—COOH$$

where R1 is a linear or branched chain lower alkyl of from 1 to 4 carbon atoms, especially a methyl, for example, aminoacetic acids such as N-methylaminoacetic acid (i.e. N-methyl glycine or sarcosine), N-ethyl-aminoacetic acid, N-butylaminoacetic acid, etc., with (2) saturated natural or synthetic fatty acids having from 8 to 18 carbon atoms, especially from 10 to 14 carbon atoms, e.g. lauric acid, and the like.

The resultant reaction products are salts which may have the formula:

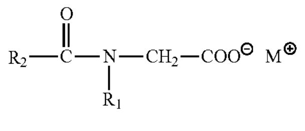

wherein:

M is an alkali metal ion such as sodium, potassium or lithium;

$R_1$ is as defined above; and $R_2$ represents a hydrocarbon chain, preferably a saturated hydrocarbon chain, having from 7 to 17 carbon atoms, especially 9 to 13 carbon atoms.

Non-limiting examples of sarcosinate surfactants include cocoyl sarcosinate, lauroyl sarcosinate, myristoyl sarcosinate, palmitoyl sarcosinate, stearoyl sarcosinate and oleoyl sarcosinate, and tallow sarcosinate. Such materials are also referred to as N-acyl sarcosinates. The inclusion of such a sarcosinate surfactants may provide an amount of thickening of the compositions. This thickening in turn may aid in the retention of the compositions on vertical or inclined surfaces and greasy burnt-on stains thereon.

The cleaning compositions of the present invention may also contain additional minor amounts of wetting agents, chelating agents, other solvents, corrosion inhibitors and fragrance, and also other additives normally added in minor amount to spray liquid or aerosol oven cleaners.

The compositions of the invention may optionally include a fragrance constituent which may be used to ameliorate the smell of other constituents of the invention. The fragrance constituent may be based on natural and/or synthetic fragrances. The fragrance constituent is most commonly mixtures or blends of a plurality of such fragrances, optionally in conjunction with a carrier such as an organic solvent or a mixture of organic solvents in which the fragrances are dissolved, suspended or dispersed. Such may be natural fragrances, e.g, natural extracts of plants, fruits, roots, stems, leaves, wood extracts, e.g. terpineols, resins, balsams, animal raw materials, e.g., civet and beaver, as well as typical synthetic perfume compounds which are frequently products of the ester, ether, aldehyde, ketone, alcohol and hydrocarbon type, e.g., benzyl acetate, linalyl acetate, citral, citronellal, methyl cedryl ketone, eugenol, isoeugenol, geraniol, linalool, and typically it is preferred to use mixtures of different perfume compounds which, together, produce an agreeable fragrance. Other suitable perfume oils are essential oils of relatively low volatility which are mostly used as aroma components. Examples are sage oil, camomile oil, clove oil, melissa oil, mint oil, cinnamon leaf oil, limeblossom oil, juniper berry oil, vetiver oil, olibanum oil, galbanum oil, labolanum oil and lavendin oil. When present in a treatment composition, in accordance with certain of the preferred embodiments, the fragrance constituent may be present in any effective amount such that it can be discerned by a consumer of the composition. However, the fragrance constituent is advantageously present in amounts of up to about 1% wt., preferably in amounts of from about 0.00001% wt. to about 0.5% wt., and most preferably in an amount of from about 0.0001% wt. to 0.5% wt. based on the total weight of the treatment composition of which it forms a part.

A further optional constituent of the treatment compositions of the invention include colorant, such as dyes and pigments, which may be used to impart a color to the compositions of which they form a part. When present, such may be included in effective amounts, advantageously from about 0.00001% wt. to about 0.5% wt., based on the total weight of the composition of which it forms a part.

A further optional constituent is a chelating agent, which, if present, is used in only a minor necessary amount, as such a chelating agent is typically acidic. Non-limiting examples include gluconic acid, tartartic acid, citric acid, oxalic acid, lactic acid, ethylenediaminetetraacetic acid, N-hydroxyethylethylenediamine triacetic acid, nitrilotriacetic acid, diethylene triamine pentaacetic acid, and their water soluble salts, especially the alkali metal salts and particularly the sodium salts. As the inclusion of a chelating agent may undesirably reduce the desired alkalinity of the compositions, if present, they are present only in a minor amount, typically between 0% wt-0.5% wt., but preferably not more than 0.2% wt, especially preferably not more than 0.1% wt. based on the total weight of the composition of which it forms a part.

When the compositions of the invention are provided within a pressurized container, the addition of corrosion inhibitors are contemplated as being of use. Exemplary useful corrosion inhibitors include alkanolamine compounds such as mono- and triethanolamine, ammonium hydroxide, sodium molybdate and sodium benzoate, borates, carbonates and polycarbonates including bicarbonates, silicates, as well as other corrosion inhibitors well known to those of ordinary skill in the art. The corrosion inhibitor, when needed, is generally present in an amount of from about 0.01% to about 0.50% wt., preferably from about 0.05-0.10% wt., based on the total weight of the composition of which it forms a part. Of course, it is to be understood that if compositions of the present invention are prepared as non-aerosol compositions, such corrosions inhibitors will not be necessary, particularly when such non-aerosol compositions are supplied in plastic bottles with trigger pumps sprays, from non-pressurized flasks, or squirt-type dispensers.

The compositions of the invention are largely aqueous in nature and comprises as the balance of the composition water in to order to provide to 100% by weight of the compositions of the invention. Preferably at least about 70% wt. of the compositions are water. The water may be tap water, but is preferably distilled and is most preferably deionized water. If the water is tap water, it is preferably substantially free of any undesirable impurities such as organics or inorganics. Any mineral salts which are present in hard water may undesirably interfere with the operation of the constituents present in the compositions according to the invention.

Preferred compositions of the invention are in the form of liquid compositions. The compositions may be provided as non-pressurized and pourable liquids which may be dispensed with a manually operated trigger pump. The compositions may be provided in a pressurized dispensing container to which a small amount of a suitable propellent is provided in addition to the treatment composition. The propellant may be material or composition which is conventionally used in the art for such purposes. Propellants which may be used include, for example, a hydrocarbon, of from 1 to 10 carbon atoms, such as n-propane, n-butane, isobutane, n-pentane, isopentane, and mixtures thereof; dimethyl ether and blends thereof, as well as individual or mixtures of chloro-, chlorofluoro- and/or fluorohydrocarbons- and/or hydrochlorofluorocarbons (HCFCs). Useful commercially available propellants include A-70 (having a vapor pressure of 70 psig available from companies such as Diversified and Aeropress) and Dymel™ 152a (1,1-difluoroethane from DuPont). Compressed gases such as carbon dioxide, compressed air, nitrogen, and possibly dense or supercritical fluids may also be used, and in view of environmental benefits may be preferred for use in many applications wherein the use of hydrocarbon based, and particularly wherein the use of chloro-, chlorofluoro- and/or fluorohydrocarbons- and/or hydrochlorofluorocarbons (HCFCs) are desirably avoided. Individual materials, or blends of materials may be used as the propellant constituent. If propellant is included as a constituent of the largely aqueous hard surface cleaning compositions, it is present in an amount of from about 0.1% wt. to about 10% wt., preferably from about 1-8% wt., more preferably from about 2-7% wt., and particularly preferably from about 3-7% wt., based on the total amount of the largely aqueous hard surface cleaning compositions of which they form a part.

The largely aqueous hard surface cleaning compositions may by formed by routine mixing of measured amounts of the constituents from which they are formed. Typically, a substantial portion of the water is first provided to a suitable stirred mixing vessel. Thereafter measured amounts of the remaining constituents are added thereto, either directly or as previously prepared premixes with a further constituent or more usually an aliquot of water. Often any pH adjusting agent is added last before or after the addition of any final amount of water. Stirring is maintained until the composition is homogenous. The hard surface cleaning compositions may be used in a non-pressurized form. Alternatively, the hard surface cleaning composition is provided to a pressurizable vessel, i.e., aerosol canister. Thereafter an additional amount of a propellant is charged to the pressurizable vessel which is then sealed, thus pressurizing the contents of the vessel. Thereafter, the cleaning compositions may by conveniently dispensed through a conventional valve and nozzle as a spray which may directed to a surface to be treated.

The largely aqueous hard surface cleaning compositions according to the invention may be applied to oven surfaces or to other surfaces encrusted with burnt-on food residue at temperatures ranging from ambient room temperature (approx. 20° C.-22° C., approx. 68° F.-72° F.) up to about 95° C. As discussed previously, formulations containing sodium hydroxide are preferably used at ambient room temperature due to the caustic nature of sodium hydroxide. Slightly elevated temperatures, such as in the range of about 70° C. to about 90° C., may be used for formulations that do not contain sodium hydroxide.

The cleaning composition should be applied in an amount sufficient to cover the entire surface to be cleaned, or at least the locus on which burnt-on stains are present. The time required to loosen or soften the burnt-on stains sufficiently to facilitate mechanical removal depends largely upon the composition, temperature used, residence time of the composition, and the particular characteristics of the burnt-on stains itself. As shown in the examples that follow, the disclosed compositions remove burnt-on stains faster than comparative prior art formulations. Formulations containing sodium hydroxide exhibited superior stain removal in as little as 3 minutes. Formulations containing alternative pH adjusting constituents also exhibited superior stain removal to comparative formulations in approximately 75 minutes. At slightly elevated temperatures, burnt-on food residues become sufficiently loosened or softened in a period of from about 2 to 10 minutes after application of disclosed compositions containing sodium hydroxide and can then be easily mechanically removed. The most stubborn burnt-on residue becomes sufficiently loosened or softened within about 75 minutes after application of compositions that do not contain sodium hydroxide. It is important to remove the softened residue as soon as quickly as possible in order to avoid drying of the cleaner composition. If such drying out occurs, small additional amounts of the composition can be applied. In most instances, even the toughest residues in cooking ovens are removed in a single application. One of ordinary skill in the art will recognize that burnt-on stains are the most difficult to remove. As a result, the disclosed compositions may also be used to remove "lesser" stains more quickly than the burnt-on stains disclosed herein, including simply baked- or cooked-on stains.

One of the principal advantages derived from this invention is that the treatment compositions provide excellent efficacy at about room temperature. Surprisingly the present inventors have discovered that the binary system of organic solvents, including both benzyl alcohol and dipropylene glycol n-propyl ether, provides a synergistic improvement in the efficacy of the treatment compositions in improving the removal of greasy burnt-on deposits or stains. This binary system appears to unexpectedly facilitate the oven cleaning effectiveness at room temperature as well as up to and at slightly elevated temperatures of the further constituents making up the balance of the treatment compositions as recited herein. Thus, the use of the aqueous treatment compositions of this invention makes possible the effective cleaning of ovens at ambient room temperature in a relatively short period of time of from about 3 minutes to about 2 hours. As discussed above, when the aqueous treatment compositions comprise a sodium hydroxide base, the cleaning time may range from approximately 1 to approximately 8 minutes at room temperature, preferably from approximately 2 to approximately 4 minutes. Aqueous treatment compositions that do not comprise a sodium hydroxide base have a cleaning time ranging from approximately 60 to approximately 90 minutes at room temperature, preferably from approximately 70 to approximately 80 minutes. Faster cleaning times may be achieved by cleaning at higher temperatures, but the elevated temperature may produce undesired fumes. As a result, cleaning at room temperature is preferred, especially for aqueous treatment compositions that do not include sodium hydroxide.

As is demonstrated with reference to the following examples, the inventive compositions are particularly effective in the treatment of and removal of stain deposits, including, in particular, burnt-on deposits or stains. The inventive compositions even remove those stain deposits which have a high content of fats/oils which have been densified, solidified or otherwise hardened due to the action of exposure to heat upon surfaces commonly encountered in cooking appliances, i.e., glass, metal, and/or enameled metal surfaces.

A further aspect of the present invention are methods which comprise the application to soiled oven surfaces of the above-described cleaning compositions, including aerosol formulations thereof. After the burnt-on food residues have been loosened or softened, they can be easily removed by washing, scraping, wiping, scrubbing or, if convenient, flushing with water.

The following examples below illustrate exemplary formulations as well as preferred embodiments of the invention. It is to be understood that these examples are provided by way of illustration only and that further compositions and articles may be produced in accordance with the teachings of the present invention.

EXAMPLES

A number of compositions according to the present invention were produced and are identified by the letter "E" prepending a digit in Tables 2, 3, and 7 below. Tables 2, 4, and 7 also identify a number of comparative compositions, which are identified by a letter "C" prepending a digit. The compositions of Tables 2-4 and 7 were formed from the raw materials identified on Table 1. These raw materials may be comprised of 100% wt. "active" of the named compound/constituent. Alternatively, if a raw material is provided as having less than 100% wt. "actives" content, such are identified on Table 1.

The weight percentages of a compound/constituent identified on Tables 2-4 and 7 are that of the "active" amount, and as being 100% wt. "active" of the named compound/constituent (i.e., the total percentages do not add to 100% because some raw materials do not contain 100% active).

Additionally, to each of the compositions was included deionized water in "quantum sufficient" (q.s.) in order to provide 100 parts by weight of the specific composition.

TABLE 1

| | |
|---|---|
| benzyl alcohol | benzyl alcohol, technical grade, ex. Aldrich Chem., or other supplier (99-100% wt.) |
| dipropylene glycol n-propyl ether | Sold under the trademark DOWANOL ™ DPnP by DOW Chem. Co. (98-100% wt.) |
| propylene glycol n-phenyl ether | Sold under the trademark DOWANOL ™ PPh by DOW Chem. Co. (98-100% wt.) |
| diethylene glycol monobutyl ether | Sold under the trademark CARBITOL ™ by Union Carbide ex. DOW Chem. Co. (99-100% wt.) |
| propylene glycol n-propyl ether | Sold under the trademark DOWANOL ™ PnP by DOW Chem. Co. (98-100% wt.) |
| monoethanolamine | Monoethanolamine, technical grade ex. DOW Chem Co. (99-100% wt.), |
| sodium hydroxide | membrane grade, ex. Aldrich Chem., or other supplier (50% wt. with balance water) |
| potassium carbonate | technical grade, ex. Aldrich Chem., or other supplier (47-48% wt. with balance water) |
| sodium lauroyl sarcosinate | Sold under the trade name Crodasinic LS30 by Croda (30% wt. with balance water) |
| silicate thickener | aqueous dispersion of 3% wt. of smectite clay, sold under the trade mark. VEEGUM ™ by Vanderbilt Minerals, LLC or POLARGEL ™HV sold by American Colloid Company |
| paraffin wax emulsion | Wax Emulsion #12, ex. American Cleaning Solutions |
| fragrance | proprietary composition of its supplier, used "as supplied" |
| propellant | n-butane ex AeroPress (100% wt.) |
| d.i. water | deionized water |

TABLE 2

| | C1 (g) | C2 (g) | E1 (g) | E2 (g) | E3 (g) |
|---|---|---|---|---|---|
| benzyl alcohol | — | — | 1.187 | 1.187 | 1.187 |
| dipropylene glycol n-propyl ether | — | — | 3.562 | 3.562 | 5.94 |
| diethylene glycol monobutyl ether | 7.125 | 7.125 | — | — | — |
| monoethanolamine | 2.5 | 2.755 | 2.5 | 2.5 | 2.755 |
| sodium hydroxide | 2.4 | — | 2.4 | 2.4 | — |
| potassium carbonate | — | 4.75 | — | — | 4.75 |
| silicate thickener | 0.90 | 0.77 | 0.90 | 0.90 | 0.77 |
| sodium lauroyl sarcosinate | — | 0.285 | — | — | 0.285 |
| paraffin wax emulsion | 0.998 | 0.95 | 0.998 | 0.998 | 0.95 |
| fragrance | 0.119 | 0.19 | 0.119 | 0.14 | 0.19 |
| propellant | 5.0 | 5.0 | 5.0 | 5.0 | 5.0 |
| d.i. water | q.s. | q.s. | q.s. | q.s. | q.s. |

The aerosol formulations of Table 2 were made from the concentrates prepared in Tables 3 and 4 (i.e., C1=C4+propellant; C2=C3+propellant; E1=E5+propellant; E2=E6+propellant; E3=E4 and propellant).

The compositions identified on Tables 3, 4, and 7 were individually formed by simple mixing of measured amounts of the individual constituents into water, optionally but preferably using an automatic stirrer to ensure that the final composition is homogenous. A preferred method of producing the compositions is as follows: to a beaker containing room temperature (approx. 20° C.-22° C., approx. 68° F.-72° F.) deionized water (approx. 20° C.-22° C., approx. 68° F.-72° F.), under constant stirring was added measured amounts of the constituents except for the sodium hydroxide and/or sodium carbonate which was added last in order to establish a target pH of at least 13 for each of the identified compositions.

TABLE 3

| | E4 (g) | E5 (g) | E6 (g) |
|---|---|---|---|
| benzyl alcohol | 1.25 | 1.25 | 1.25 |
| dipropylene glycol n-propyl ether | 6.25 | 3.75 | 3.75 |
| monoethanolamine | 2.90 | 2.63 | 2.63 |
| sodium hydroxide | — | 2.5 | 2.5 |
| potassium carbonate | 5.00 | — | — |
| sodium lauroyl sarcosinate | 0.30 | — | — |
| silicate thickener | 0.81 | 0.95 | 0.95 |
| paraffin wax emulsion | 1.0 | 1.05 | 1.05 |
| fragrance | 0.2 | 0.125 | 0.15 |
| propellant | — | — | — |
| d.i. water | q.s. | q.s. | q.s. |

TABLE 4

| | C3 (g) | C4 (g) | C5 (g) | C6 (g) | C7 (g) |
|---|---|---|---|---|---|
| benzyl alcohol | — | — | — | 1.25 | 1.25 |
| propylene glycol n-phenyl ether | — | — | — | 6.5 | — |
| diethylene glycol monobutyl ether | 7.5 | 7.5 | 7.5 | — | — |
| propylene glycol n-propyl ether | — | — | — | — | 6.5 |
| dipropylene glycol n-propyl ether | — | — | — | — | — |
| monoethanlolamine | 2.90 | 2.63 | 2.63 | 2.9 | 2.9 |
| sodium hydroxide | — | 2.5 | 2.5 | — | — |
| potassium carbonate | 5.00 | — | — | 5.00 | 5.00 |
| sodium lauroyl sarcosinate | 0.3 | — | — | 0.3 | 0.3 |
| silicate thickener | 0.81 | 0.95 | 0.95 | 0.81 | 0.81 |
| paraffin wax emulsion | 1.00 | 1.05 | 1.05 | 1.0 | 1.0 |
| fragrance | 0.2 | 0.125 | 0.15 | 0.2 | 0.2 |
| propellant | — | — | — | — | — |
| d.i. water | q.s. | q.s. | q.s. | q.s. | q.s. |

In the foregoing Tables, E1-E6 illustrate example compositions of the invention comprising the binary system of organic solvents, including both benzyl alcohol and dipropylene glycol n-propyl ether. C1-C7 illustrate comparative example compositions outside of the scope of the invention.

Soil Removal Testing:

Certain compositions of Tables 2-4 were tested for their efficacy in removing burnt-on deposits from hard surfaces, representative of those as are typically encountered on stovetops and oven surfaces. The following materials and protocols were used. Cleaning results are reported on the following further tables.

Standardized Soil Preparation:

A 1 kg mixture of soil was prepared and used in the following tests. The soil was designed to mimic real-world burnt-on cooking stains. A premixture was formed which included approximately 40-45% w/w oil; approximately 10-17% w/w pie filling; approximately 25-35% w/w fatty ground meat; approximately 1-3% w/w seasoning, with the remainder deionized water. The constituents of the premixture were combined in a baking tray and baked at 400° F. (205° C.) for 2 hours. After baking, the liquid was drained and filtered through several layers of cheesecloth while still hot. The resulting filtrate should be clear and devoid of any particulate matter. The filtrate may be filtered again to obtain clarity. Commercially available flour was blended with the filtrate at a weight ratio of filtrate:flour of approximately 6-7:1 to form the test soil used in all further testing.

Cleaning Testing:

A large number of identically sized rectangular white porcelain enameled steel tiles were cleaned with a light duty dishwashing detergent. The tiles were then rinsed with ethanol. The tiles were stacked in a vertical rack and allowed to air dry. Prior to the application of any composition, the surface reflectance value "R1" for each cleaned tile was evaluated using a digital imager (such as an Ortery™ Photosimile 200 PhotoBooth device or similar). The R1 value for each tile was recorded.

The test soil is preheated to 100° F. using a water bath. A 2.7-3.1 gram aliquot of the heated test soil was applied to and evenly spread upon one surface of the tile laid upon a horizontal laboratory bench. The tiles were placed on trays and baked in a convection oven for 60 minutes at 500° F. (260° C.) to form the burnt-on greasy soil. Afterwards, the tiles were allowed to cool to room temperature (approx. 20° C.-22° C., approx. 68° F.-72° F.) for 24 hours. The test tiles were used in evaluating the cleaning performance of a composition. Prior to the application of any cleaning composition onto a tile for evaluation of its cleaning performance, the surface reflectance of each soiled tile "R2" was evaluated using the digital imager. The R2 value for each tile was recorded.

The soil removal efficacy of a composition at room temperature was undertaken with the use of a Garner Straight Line Abrasion Tester. Individual cellulose sponges were washed in a washing machine and subject to three rinse cycles. Prior to testing, the sponges were wetted in water and manually squeezed to remove excess water. Thereafter a measured amount of a test composition was applied to one surface of the damp sponge.

An aliquot of between about 2.7 grams and 3.1 grams of the test composition was applied by being sprayed directly to the coated surface of a previously unused soil-coated tile having recorded R1 and R2 values. The tile was in a horizontal orientation during application of the test composition. The tiles were then placed in the specified position (i.e., horizontal or vertical) and undisturbed for the specified contact interval. A "vertical" orientation of a test tile is to be understood that a test tile was oriented vertically and formed an angle of between 85-95 degrees of arc relative to a horizontal plane. A "horizontal" orientation of a test tile is to be understood that the test tile was essentially coplanar with a horizontal plane, i.e, was "flat" relative thereto, or formed an angle of between 0-5 degrees of arc relative to the horizontal plane.

Immediately thereafter, the tile was placed in a Garner Tester, which was operated to provide 10 cycles (each cycle being one forward and one return stroke) of the sponge. The tile was removed from the tester. The portion of the tile abraded by the sponge was rinsed gently with cool tap water for up to 5 seconds. Thereafter the tested tile was permitted to dry. The surface reflectance of the portion of the tile abraded by the sponge "R3" was evaluated using the digital imager. The R3 value for each tile was recorded. Each composition was tested using 6 tiles, thus providing 6 replicates for each composition being tested.

The percentage of the burnt-on greasy test soil from each tile was determined utilizing the following equation:

$$\%\ \text{soil removal}=[(R1-R2)/(R3-R2)]\times 100$$

The results of the testing, and the identity of the tested compositions are illustrated on the following Tables. The % soil removal are also indicated. The indicated results are the numerical average of the % soil removal values for the 6 tiles used in the test.

TABLE 5

| | C1 | C1 | E1 | C2 | C2 | E3 | E3 | C6* | C7* |
|---|---|---|---|---|---|---|---|---|---|
| test tile orientation (V = vertical, H = horizontal) | H | V | H | H | V | H | V | H | H |
| contact interval (minutes) | 5 | 5 | 3 | 120** | 120 | 75 | 75 | 75 | 75 |
| % soil removal | 55.63 | 67.79 | 87.73 | 96.20 | 99.48 | 98.10 | 99.58 | 14.13 | 38.30 |

*the concentrated formulations of C6 and C7 were added to pressurizable canisters and 5% propellant added prior to testing and tested on 8 tiles.
**for a different, but similarly prepared tile, only 14.4% soil removal was achieved at 75 minutes Applicant expects E1 and E2 to perform similarly, as the only difference between the formulations is concentration of the fragrance. As can be understood from the results reported on Table 5, compositions of the invention were faster acting than comparative compositions, achieving comparable or superior % soil removal in less time.

Additional testing was performed on pipetted samples of the concentrate formulations in a horizontal position. The results are provided in Table 6.

TABLE 6

| | E4 | E5 | d.i. water as a comparative composition |
|---|---|---|---|
| Contact interval (minutes) | 75 | 20 | 120 |
| % soil removal | 91.90% | 94.05% | 0.69% |

As seen from Table 6, the E4 and E5 concentrates are as effective as formulations E1 and E3 in Table 5. Once again, Applicant expects E5 and E6 to perform similarly, as the only difference between the formulations is concentration of the fragrance.

Impact of Binary System Solvent Concentration

The foregoing test protocol was used to evaluate the effect of solvent concentration in the additional concentrate compositions identified in Table 7.

TABLE 7

| | C8 | C9 | C10 | C11 | E7 | E8 | E9 |
|---|---|---|---|---|---|---|---|
| benzyl alcohol | 1.25 | 1.25 | 1.25 | 1.25 | 1.25 | 1.25 | 1.25 |
| dipropylene glycol n-propyl ether | 5 | 5.5 | 6 | 6.125 | 6.25 | 6.5 | 7 |
| monoethanlolamine | 2.9 | 2.9 | 2.9 | 2.9 | 2.9 | 2.9 | 2.9 |
| potassium carbonate | 5.0 | 5.0 | 5.0 | 5.0 | 5.0 | 5.0 | 5.0 |
| sodium lauroyl sarcosinate | 0.3 | 0.3 | 0.3 | 0.3 | 0.3 | 0.3 | 0.3 |
| silicate thickener | 0.81 | 0.81 | 0.81 | 0.81 | 0.81 | 0.81 | 0.81 |
| paraffin wax emulsion | 1.00 | 1.05 | 1.0 | 1.0 | 1.0 | 1.0 | 1.0 |
| fragrance | 0.2 | 0.2 | 0.2 | 0.2 | 0.2 | 0.2 | 0.2 |
| propellant | — | — | — | — | — | — | — |
| d.i. water | q.s. | q.s. | q.s. | q.s. | q.s. | q.s. | q.s. |

Each of the formulations of Table 7 had a pH of at least about 13.

The formulations of Table 7 were evaluated as described above. The results of the testing are illustrated in Table 8. The indicated results are the numerical average of the % soil removal values for the 4 tiles used in the test after a 75 minute horizontal orientation contact time.

TABLE 8

| | C8 | C9 | C10 | C11 | E7 | E8 | E9 |
|---|---|---|---|---|---|---|---|
| % soil removal | 44.4 | 54.9 | 38.1 | 51.6 | 80.3 | 95.7 | 94.5 |

One of ordinary skilled in the art will recognize that tile variability may impact cleaning results. The use of 4 tiles also makes the impact from any tile variability greater. In other words, the results for C10 appear to be an outlier.

As seen from Table 8, a minimum of 6.25 wt % dipropylene glycol n-propyl ether provides superior cleaning efficacy for formulations that do not contain sodium hydroxide. As discussed previously, lower amounts of dipropylene glycol n-propyl ether may be used in formulations containing sodium hydroxide.

The invention claimed is:

1. An aqueous hard surface cleaning composition effective in the removal of burnt-on deposits from stovetop and oven surfaces at room temperature, the composition comprising:

4-25% wt. of a binary system of organic solvents which consists of benzyl alcohol and dipropylene glycol n-propyl ether, and wherein the total amount of both benzyl alcohol and dipropylene glycol n-propyl ether provide at least 75% wt. of the total amount of organic solvents present;

a water soluble or water dispersible thickener constituent;

wherein the composition has a pH of at least 10 and exhibits a viscosity at room temperature of at least 40 cPs as measured by Brookfield LVT #3 at 30 RPM for 60 seconds.

2. The composition of claim 1, wherein the system has a weight ratio of benzyl alcohol:dipropylene glycol n-propyl ether of about 0.05-0.75:1.

3. The composition of claim 1, wherein the binary system provides 100% wt. of the total amount of organic solvents present.

4. The composition of claim 1, further comprising a pH adjusting constituent.

5. The composition of claim 4, wherein the a pH adjusting constituent is not sodium hydroxide.

6. The composition of claim 5, wherein the composition comprises at least 6.25% wt. dipropylene glycol n-propyl ether.

7. The composition of claim 1, wherein the water soluble or water dispersible thickener constituent is a colloid-forming clay and/or a wax based thickener.

8. The composition of claim 1, which further comprises up to 5% wt. of a surfactant.

9. The composition of claim 8, wherein the surfactant constituent is a sarcosinate surfactant.

10. The composition of claim 9, wherein the sarcosinate surfactant is an N-acyl sarcosinate.

11. A method of removing burnt-on deposits from stovetop and oven surfaces, at or at about room temperature and/or at higher temperatures, the method comprising the step of:

applying the composition of claim 1 onto a surface containing burnt-on deposits and allowing the composition to remain in contact with the surface for a sufficient time whereby at least a part of the greasy baked deposit is released from the surface on which it is present.

12. The method of claim 11, wherein the method is performed at about room temperature.

13. The method of claim 11, wherein the method removes approximately 80% of the burnt-on deposits from the surface and the sufficient time ranges from approximately 70 minutes to approximately 80 minutes.

14. The method of claim 11, wherein the composition comprises sodium hydroxide, the method removes approximately 80% of the burnt-on deposits from the surface, and the sufficient time ranges from approximately 4 to approximately 8 minutes.

15. The composition of claim 2, wherein the system consists of benzyl alcohol and dipropylene glycol n-propyl ether.

16. The composition of claim 15, wherein the system provides 100% wt of the total amount of organic solvents present.

* * * * *